United States Patent [19]

Reddy

[11] 4,032,091

[45] June 28, 1977

[54] FUEL LINE EVACUATION SYSTEM

[75] Inventor: Thomas J. Reddy, Mentor, Ohio

[73] Assignee: Thomas J. Reddy, Trustee, Mentor, Ohio

[22] Filed: Mar. 5, 1976

[21] Appl. No.: 664,308

[52] U.S. Cl. .................... 244/135 R; 60/39.09 F; 123/136; 169/62

[51] Int. Cl.² .................... B64D 37/32; A62C 1/10

[58] Field of Search ............... 244/135 R; 137/209; 169/62; 60/39.09 F, 261; 123/136, 198 DB

[56] References Cited

UNITED STATES PATENTS

| | | | |
|---|---|---|---|
| 2,015,995 | 10/1935 | Egtvedt | 169/62 |
| 2,038,998 | 4/1936 | Hammond | 244/135 R |
| 2,413,087 | 12/1946 | Urbany | 169/62 |
| 3,509,942 | 5/1970 | Lindberg | 169/62 |

Primary Examiner—Trygve M. Blix
Assistant Examiner—Charles E. Frankfort
Attorney, Agent, or Firm—John Harrow Leonard

[57] ABSTRACT

A fuel line leading from a fuel supply tank of a self-propelled aircraft to the engine is equipped with a normally open fuel cut-off valve adjacent the tank and with a vent control valve adjacent the engine. The vent control valve is normally open for supplying fuel to the engine and normally closed with respect to a vent which discharges into the atmosphere. At one end of the fuel line, in advance of these two valves, in the normal direction of flow of fuel through the line, the fuel line is connected to a pressurized source of evacuating fluid, such as a drum of carbon dioxide. A normally closed evacuation control valve is interposed in the line at that end at a location adjacent the evacuating fluid source and in advance of the fuel cut-off valve. A sequence control is connected to the valves and, when rendered operative, at the choice of the operator, causes the valves to operate in a sequence in which the fuel cut-off valve is closed and promptly after, or concurrently with, said closure the vent control valve and the evacuation valve are opened so as to introduce the evacuating fluid into the line and to vent the line, respectively, without blow-back into the tank.

11 Claims, 4 Drawing Figures

FUEL LINE EVACUATION SYSTEM

BACKGROUND OF INVENTION

1. Field of Invention

Fuel line evacuation system.

2. Prior Art

In aircraft powered by internal combustion engines of the reciprocating, rotary, or jet type, various systems have been provided for evacuating the fuel tanks while in flight in event of fire or imminent danger of a crash. Such a tank evacuation system is disclosed, for example, in a patent to Conley, U.S. Pat. No. 1,793,777, and in a patent to Rice, U.S. Pat. No. 2,248,308. However, it often happens that the engine of the vehicle is quite remote from the fuel tank, and relatively long fuel supply lines are required to conduct fuel from the tank to the engine. Generally such lines are disposed immediately beneath the floor, or behind the inner walls, of the passenger compartment of the aircraft. In large planes, and particularly in jet planes, which necessarily require a large continuous flow of fuel to the engine or engines, the fuel lines are of substantial internal diameter and at all times contain a large quantity of a highly volatile and explosive fuel. As a result of collisions, severe changes in air currents, and crashes, the fuel lines are apt to be ruptured with the result that dangerously large quantities of fuel are poured into, or over the walls of, the passenger compartment. Even though the ignition of the engines be turned off, sparks due to friction, static, and other causes are apt to cause ignition of such gases and spilled fuel, particularly in a crash. Thus the lines from the tank to the engine are, in effect, a sub-storage tank, containing a quantity of fuel large enough to be extremely hazardous if it is spilled and ignited. However, though fuel tank evacuation systems are known, it appears that no system has been provided for evacuating the fuel lines themselves, separately and independently of the tanks.

The present invention has to do with a system, operative independently of that used for evacuation of the tanks, for evacuating the fuel lines.

Summary

A fuel line evacuating system by which, in sequence, the fuel supply from the fuel tank of the aricraft is cut off from the fuel line, and, following this cut-off, the fuel supply from the line to the engine is cut off and substantially concurrently therewith the fuel line as a whole is vented to the atmosphere, and thereupon the line is evacuated by the introduction into the line of pressurized non-combustible fluid, such as carbon dioxide gas or fire extinguishing gas or liquid in a sufficient quantity for forcing substantially all of the fuel in the line out through the vent into the atmosphere. Safety means are provided to eliminate or reduce chances of inadvertent operation of the system.

Other objects and advantages will become apparent from the following description wherein reference is made to the drawings.

BRIEF DESCRIPTION OF THE DRAWINGS

Referring to the drawings, FIG. 1 illustrates a conventional jet plane 1 having a single jet engine 2 to which fuel supplied from a suitable tank 3, portions of which usually are in the wings, respectively. Fuel is supplied from the tank or tanks 3 to the engine 2 by means of a fuel line 4. In accordance with the present invention, a normally open tank control valve 5 is connected in the line 4, between the tank and engine, and closely adjacent to the tank 3. The valve 5, shown in the form of the system illustrated in FIGS. 1 and 2, is normally spring biased to open position by a spring 6 and is movable to a closed position by, and upon energization of, a solenoid 7.

Figure 1:
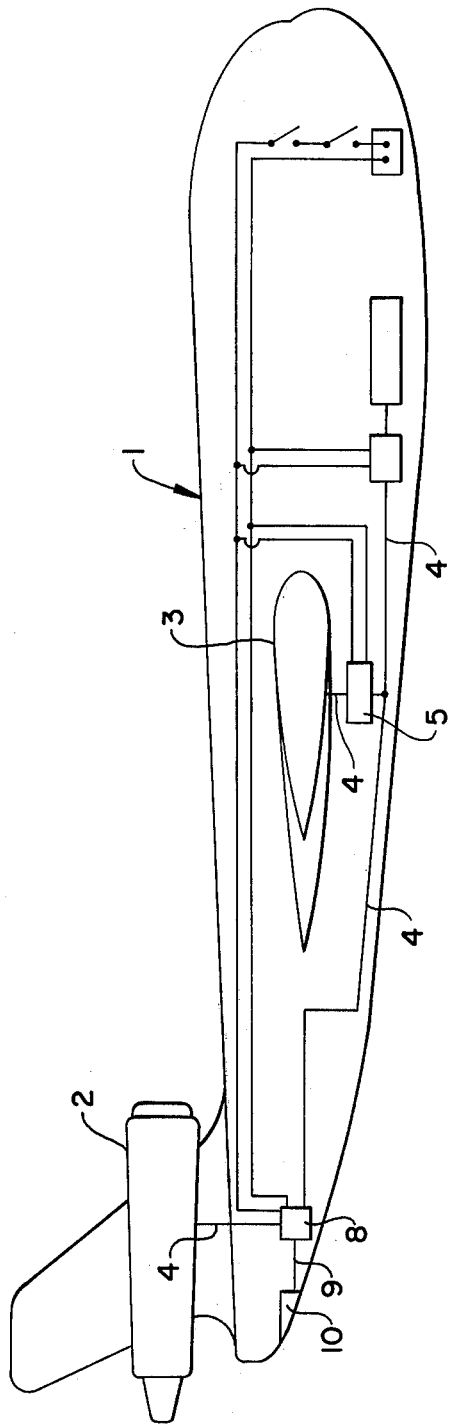
FIG. 1 is a diagrammatic illustration of a jet airplane employing a single jet engine and wing tanks, with the sequential system of the present invention installed therein.
Figure 2:
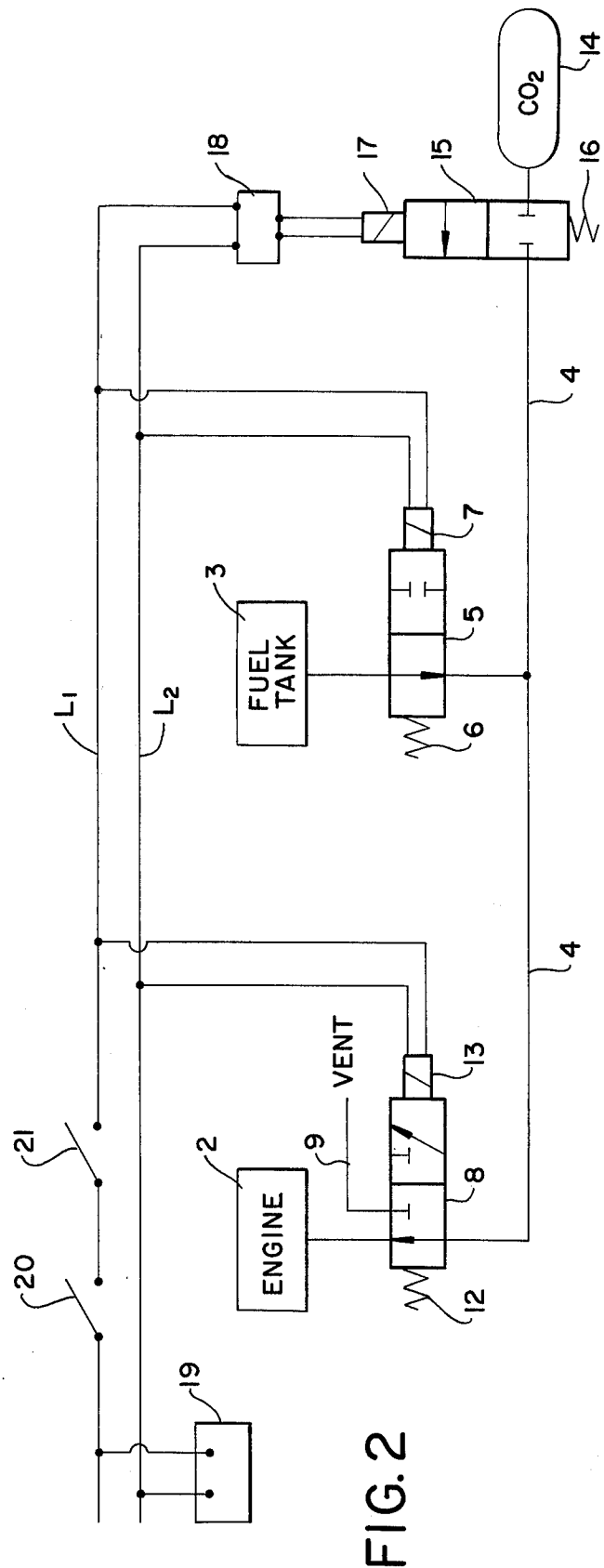
FIG. 2 is a diagrammatic illustration of the system of FIG. 1, wherein the sequence of operation is controlled electrically.

In the fuel line 4, adjacent to the engine 2, is a vent control valve 8 for cutting off the supply of fuel to the engine 2 and substantially concurrently connecting the line 4 to a short vent line 9. The line 9 leads to a suitable vent device 10 which is arranged to discharge the vented fuel from the line 4 into the atmosphere. The valve 8 is biased by a spring 12 to a normally open position with respect to the engine 2, in which it connects the line 4 to the engine, and concurrently to a normally closed position with respect to the vent device 10, in which position it disconnects the line 4 from the line 9. The valve 8 is operated by a solenoid 13 which, when energized, moves the valve to a position in which it shuts off the supply of fuel from the line 4 to the engine and connects the line 4 to the vent device 10 through the vent line 9.

The solenoids 7 and 13 are connected in parallel with each other across power line $L_1$ and $L_2$.

In order to evacuate the fuel line, a suitable source of pressurized evacuation fluid is employed. The evacuation fluid may be an inert non-flammable gas or liquid and, in fact, may be of the fire extinguishing type. In the form illustrated, the source is shown as a cylinder or drum 14 of pressurized carbon dioxide gas. This source is arranged to be connected by an evacuation control valve 15 to the line 4 at a location in advance of both the fuel tank control valve 5 and the vent control valve 8 in the normal direction of flow of fuel from the tank 3 to the engine 2. Preferably, this source is at the extreme end of the line opposite from the vent device 10, and is as close to the discharge side of the tank control valve 5 as practicable so that, once it is connected to the vented line 4, substantially all of the fuel in the entire line 4 is evacuated. the evacuation control valve 15 is normally closed and solenoid operated, being biased by a spring 16 to closed position and open by a solenoid 17 when the solenoid is energized. The solenoid 17 is connected in parallel with the solenoids 7 and 13 across the lines $L_1$ and $L_2$.

A time delay device 18, of conventional form, preferably is provided between the solenoid 17 and power lines $L_1$ and $L_2$ so as to delay the operation of the valve 15 relative to the operation of the valves 5 and 8, and particularly relative to the valve 5, so that the valve 5 is closed and the line 4 is vented before the pressurized evacuation fluid is admitted to the line 4. This assures that the full charge of evacuating pressure fluid will be used for evacuating the line 4 and will not blow back through the tank 3, whether the tank has been evacuated or still contains fuel. If desired, this time delay can be accomplished merely by making the solenoid 17 less quickly responsive in its operation than the solenoid 7. The important feature is that the valve 15 be open not earlier than the closure of the valve 5, and preferably slightly after closure of the valve 5. The valves 5 and 8 may open simultaneously.

The lines $L_1$ and $L_2$ are connected to the opposite terminals, respectively, of a source such as battery 19. Operatively interposed between the battery 19 and the solenoids 7, 13 and 17 are normally open switches 20 and 21 which are connected in series in the circuit of lines $L_1$ and $L_2$, and which, when both are closed, energize the solenoids. Only one switch normally would be necessary. However, there is always danger that a single switch might inadvertently be struck and closed, during normal flight, thereby stopping the engine and evacuating the fuel line. Consequently, the two switches 20 and 21 are employed and are placed at locations remote from each other so as to reduce the likelihood of the two being inadvertently closed at the same time and connecting the solenoids to the source of power. With the two switches, it is necessary to close each switch deliberately and hold it closed so that both are closed concurrently by the operator of the aircraft and another member of the crew.

Operation

In operation, the switches 20 and 21 are closed, whereupon practically instantly the valve 5 cuts off the supply of fuel from the tank 3 to the line 4, and the valve 8 cuts off the supply of fuel to the engine and connects the line 4 to the vent line 9. These operations are followed almost immediately, but with a slight time delay, by opening the valve 15 and thereby introducing the pressurized fluid from the drum 14 into the line 4 and blowing the fuel therefrom through the vent line 9 and venting device 10.

Figure 3:
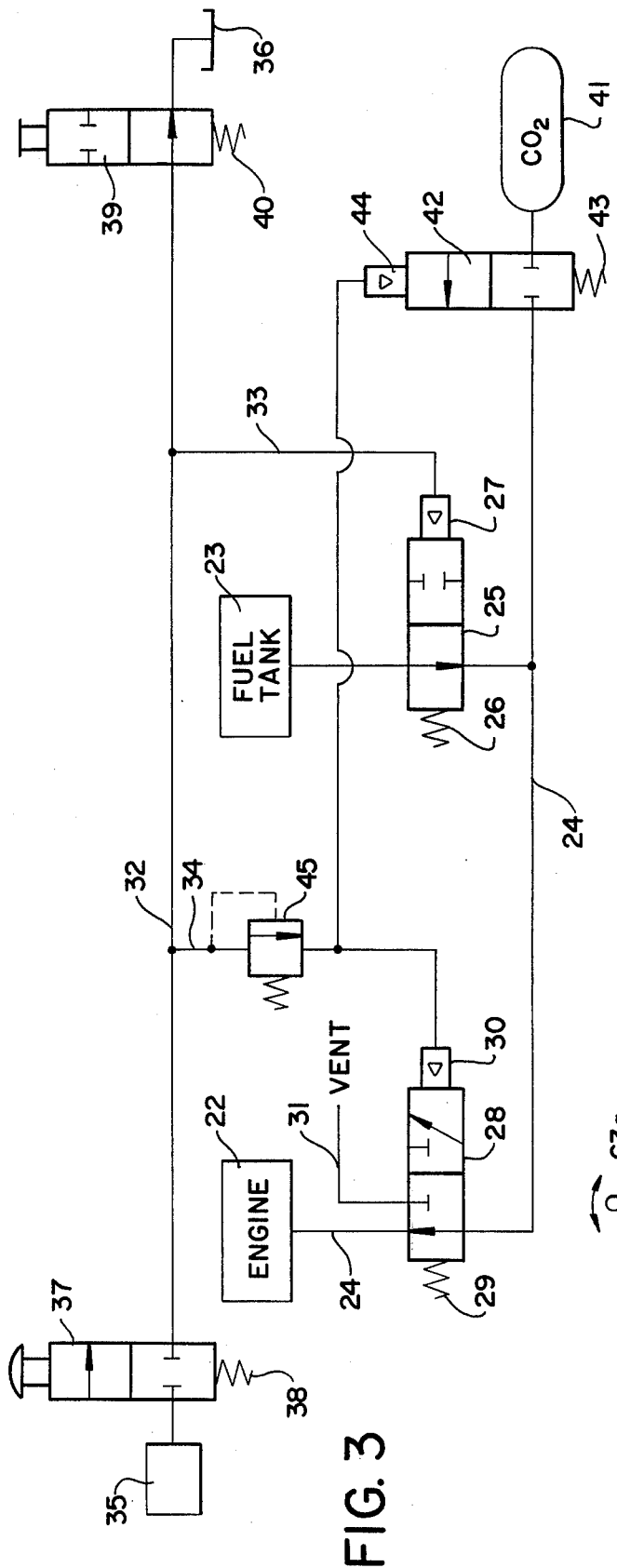
FIG. 3 is a diagrammatic illustration of a like system wherein the sequence of operation is controlled hydrualically or pneumatically.

Referring next to FIG. 3, a like system is shown, but adapted for control by hydraulic or pneumatic fluid. In this form, the engine 22 is supplied wih fuel from a tank 23 through the fuel line 24, in the same manner as heretofore described. The fuel flow from the tank 23 is controlled by a valve 25 which is spring biased by a spring 26 to a normally open position and which is closed by a fluid pressure operated piston and cylinder assemblage 27. A normally open valve 28, corresponding to the valve 8, controls the the supply of fuel to the engine 22. This valve is biased to open position with respect to the engine by means of a spring 29. The valve is movable by a fluid operated piston and cylinder assemblage 30 to a position in which it disconnects the engine from the line 24 and connects the line 24 to a vent line 31.

The piston and cylinder assemblage 27 is connected to a main pressurized fluid pressure 32 by means of a branch line 33. The piston and cylinder assemblage 30 is connected to the main line 32 by a branch line 34.

One end of the line 32 is connected to a source 35 of pressurized hydrualic or pneumatic fluid. The opposite end of the line is connected to a sump 36 or to atmosphere. Interposed between the source 35, on the one hand, and the remainder of the structure described is a manually operable, normally closed control valve 37 biased by a spring 38 to a closed position. The valve 37 is arranged so that it may be pushed to an operating position in which it connects the fluid source to the line 32. If the line 32 were blocked at the sump 36, such operation would cause operation of the valves 25 and 28, and so, the sump may be omitted and that end of the line 32 blocked. However, a safety feature is desired to reduce the possibility of an inadvertent operation of the system. For this purpose, a normally open valve 39 is connected in the line 32 in series with, and adjacent to, the sump 36. The valve 39 is maintained normally in an open position by a spring 40, for connecting the line 32 to the sump. The valve 39 may be depressed for closing the connection of the line 32 to the sump. while the valve 39 is held closed, opening of the valve 37 delivers the operating pressure fluid from the line 32 to the piston and cylinder assemblages 27 and 28. Thus both the valves 37 and 39 must be depressed and held concurrently in depressed condition to cause operation of the valves 25 and 28. As in the earlier described system, the evacuation pressure fluid may be carbon dioxide supplied from a tank or pressurized cylinder or drum 41 through a normally closed valve 42 which is held closed by a spring 43 and can be opened by a piston and cylinder assemblage 44.

It is noted that in this form, the piston and cylinder assemblage 27 for the valve 25 of the fuel tank 23 is connected for instant flow of operating pressure fluid thereto from the line 32 through the branch line 33. Since it is desirable that the valve 25 to the tank be closed before the introduction of the evacuation pressure fluid through the valve 42, the piston and cylinder assemblages 30 and 44 for the valves 28 and 42, respectively, are connected in parallel with each other and with the line 34 and interposed between their connection with the line 34 and the connection of the line 34 with the line 32, a sequence valve 45 is provided. This valve is set to open only after the control pressure in the line 32 has increased sufficiently to cause closure of the valve 25, thereby assuring that the connecting of the fuel line 24 with the fuel tank 35 is cut off before the introduction of the evacuation pressure fluid from the cylinder or durm 41.

Figure 4:
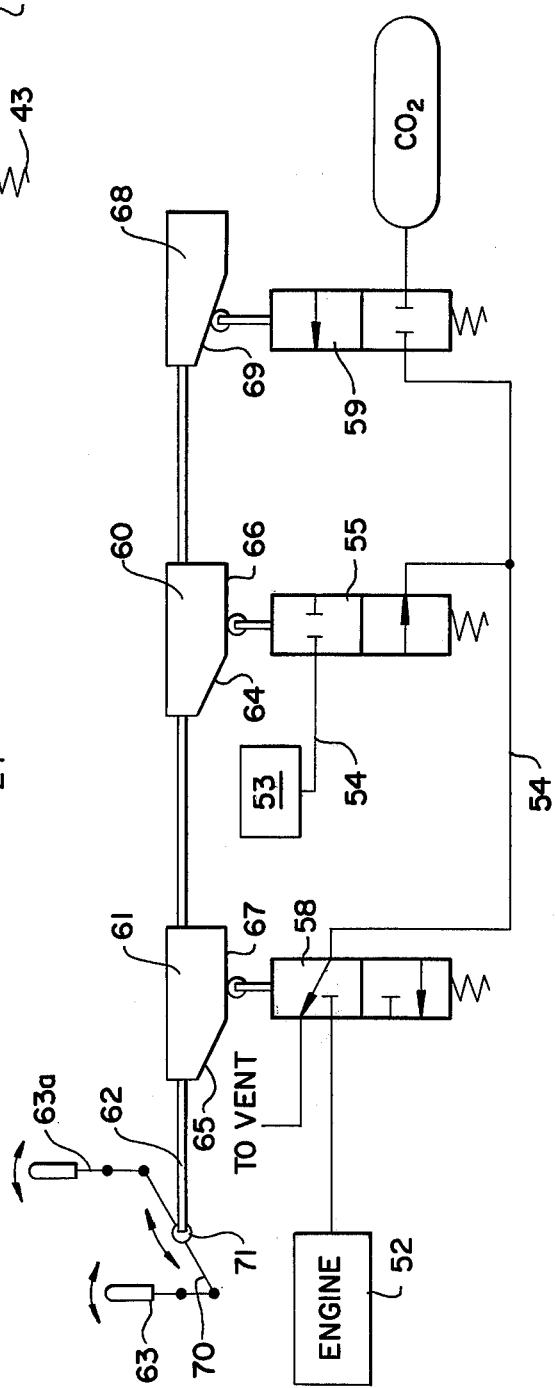
FIG. 4 is a similar system wherein the sequence of operation is controlled by cams and mechanical levers.

Referring next to FIG. 4, a mechanical arrangement of the system is shown. In this form, the engine is indicated at 52, the fuel tank at 53, and the fuel line at 54. A valve 55, corresponding to valve 5 in FIG. 1, controls the flow of fuel from the fuel tank to the line 54. A valve 58, corresponding to the valve 8 in FIG. 1, controls the flow of fuel to the engine 52 and to the vent. The evacuation control valve is indicated at 59. These valves are arranged to be operated in the sequence heretofore described by means of suitable cams. Since the valves 55 and 58 are preferably to be operated before operation of the valve 59, they are operated by suitable cams 60 and 61, respectively, which are connected to a suitable push rod 62 operated by hand levers 63 and 63a. The cams 60 and 61 have rise portions 64 and 65, respectively, and dewll portions 66 and 67, respectively, so that upon movement of the rod 62 to the left, the valves 55 and 58 are first operated fully to their new position by the rise portions 64 and 65, respectively, and, due to the dwells 66 and 67, remain in said positions as the rod 62 continues to move to the left for an interval. The valve 59 is operated by a cam 68 which has a longer rise portion 69, so arranged that it does not open the valve 59 until after the valves 55 and 58 are open. Therefore, the same sequence as heretofore described is obtained.

In order to incorporate the same safety feature to prevent inadvertent operation, the rod can be operated only be concurrent operation of the two levers 63 and 63a. For this purpose, these levers are pivotally connected to the opposite ends of a common single rock bar 70 which, in turn, is pivotally connected at its mid portion, as indicated at 71, to the control rod 62. Thus both levers 63 and 63a must be in final operated position concurrently in order to drive the rod 62 to the left.

It is apparent from the foregoing description that effective evacuation of the fuel lines is obtainable, regardless of whether the fuel tank has already been evacuated or not, and there is no danger of driving the fuel from the line into the tank or into the compartment where the tank is located, or of wasting and venting of the evacuation pressurized fluid back through the fuel tank or of leaving any flow of fuel from the tank intereferring with evacuation of the fuel lines. This assures that the entire charge of the evacuation fluid is used to clear the fuel line.

If carbon dioxide is used as the evacuation fluid, it reduces the possibility of combustion within the line, and resists firing of fuel escaping through a break. The same is true if the evacuating fluid is a fire extinguishing liquid.

Generally, fuel lines are within a range of diameters such that there is little or no likelihood of the carbon dioxide passing over the top of any fuel contained in the line, the action being so sudden that the fuel generally is pushed ahead to the vent as a solid continuous column by the carbon dioxide.

Having thus described my invention, I claim:-

1. A fuel line evacuation system for aircraft including a fluid fuel operable engine, a tank for the fuel, and a fuel line connecting the tank to the engine, said system comprising:
   means providing a vent for said fuel line;
   a vent control valve means in said fuel line near the engine and normally in a first operative position in which, concurrently, the vent control valve means admits fuel to the engine and prevents the escape; of fuel from the vent, and movable to a second operative position in which, concurrently, the vent control valve means stops the admission of fuel to the engine and vents the fuel line through said vent;
   a tank control valve means near the tank and normally in a first operative position in which the tank control valve means connects the tank to said fuel line, and movable to a second operative position in which the tank control valve means blocks the flow of fuel from the tank to said fuel line;
   a pressurized source of evacuation fluid;
   an evacuation control valve in said fuel line in advance, in the normal direction of flow of fuel through said fuel line, of both of said valve means and normally closed for preventing the discharge of evacuation fluid from said source into said fuel line, and movable to an open position in which it admits said evacuation fluid into said fuel line; and
   sequence control means connected to both of said valve means and said evacuation valve and operable for causing sequential operation thereof in a sequence such that the tank control valve means is closed not later than at the time said vent control valve means and the evacuation control valve are opened.

2. The fuel system according to Claim 1 wherein said sequence control means sequence means which, when set in one operative position, constrains both of said valve means and said evacuation control valve to function in said sequence.

3. The fuel line system according to Claim 1 wherein both of said valve means and said evacuation valve are solenoid operated and the solenoids thereof are electrically connected in a parallel circuit which is adapted for connection to an electric power source; and
   normally open electric switch means are interposed in said circuit and are operative, when closed, to connect the solenoids for energization by said power source.

4. The fuel line system according to Claim 3 wherein the solenoids of both of said valve means and of said evacuation control valve are connected in said circuit so that energization of all of the solenoids can be maintained concurrently during a predetermined period.

5. The fuel line system according to Claim 4 wherein said circuit comprises two power lines, and a master control means comprising two normally open switches connected in said power lines in series with each other so that both switches must be closed to energize said solenoids.

6. the fuel line system according to Claim 1 wherein both of said valve means and said evacuation control valve are fluid pressure operated;
   a fluid pressure circuit, having a fluid pressure line adapted for connection to an operating pressure source, is provided; and
   both of said valve means and said evacuation control valve are connected for operation in parallel with each other to said fluid pressure line.

7. The fuel line system according to Claim 6 wherein a normally closed, pressure operated sequence valve is interposed in said fluid pressure line between said vent control valve means and said evacuation control valve, and said sequence valve is opened by the pressure fluid in said fluid pressure line, when the pressure of the fluid increases to a predetermined amount greater than that required to operate said tank control valve means.

8. The fuel line system according to Claim 7 wherein a normally closed main valve is connected in said fluid pressure line at a location between said operating pressure source, on the one hand, and both of said valve means and said evacuation control valve, on the other hand, and is operable to be opened for connecting both of said valve means and said evacuation control valve to said operating pressure source.

9. The fuel line system according to Claim 8 wherein a normally open fluid pressure line valve is connected in said fluid pressure line at a location beyond the connection therewith of both of said valve means and said evacuation control valve, in the direction of flow of pressure fluid through said main valve, and is normally operative to vent said fluid pressure line to permit the escape of operating pressure fluid therethrough from the fluid pressure line, and is movable to a closed position in which it blocks the escape of pressure fluid therethrough from said fluid pressure line.

10. The fuel line system according to Claim 2 wherein the sequence control means includes a time delay means for delaying the opening of said evacuation control valve relative to the closure of said tank control valve means.

11. The fuel line system according to Claim 1 wherein said sequence control means includes valve driving cams for both of said valve means and for said evacuation control valve, respectively;

a common actuator for all of the cams for driving them concurrently from idle position in which both of said valve means and said evacuation control valve are closed, to fuel operating position in which both of the valve means and said evacuation control valve are open;

each of the cams has a rise portion and a dwell portion; and the said sequential operations are dependent upon preselected interrelations of the rise and dwell portions of the cams.

* * * * *

UNITED STATES PATENT AND TRADEMARK OFFICE
CERTIFICATE OF CORRECTION

PATENT NO. : 4,032,091
DATED : June 28, 1977
INVENTOR(S) : Thomas J. Reddy

It is certified that error appears in the above-identified patent and that said Letters Patent are hereby corrected as shown below:

```
Col. 1, line 47, for "aricraft" read --aircraft--.
Col. 2, lines 5 and 6, for "hydrualically" read
        --hydraulically--.
        line 39, for "line" read --lines--.
Col. 3, line 43, for "wih" read --with--.
Col. 4, line 42, for "durm" read --drum--.
Col. 5, line 3, change "be" to --by--.
Col. 6, line 1, after "fuel" read --line--.
        line 2, after "means" (first occurrence) read
        --are--.
Col. 7, line 6, for "fuel" read --full--.
```

Signed and Sealed this

Twentieth Day of September 1977

[SEAL]

Attest:

RUTH C. MASON
Attesting Officer

LUTRELLE F. PARKER
Acting Commissioner of Patents and Trademarks